United States Patent
Oguchi et al.

(10) Patent No.: US 9,441,804 B2
(45) Date of Patent: Sep. 13, 2016

(54) VEHICLE LAMP

(71) Applicant: HONDA MOTOR CO., LTD., Tokyo (JP)

(72) Inventors: Tsuyoshi Oguchi, Wako (JP); Shigeru Kodaira, Wako (JP); Nobuyuki Takenaka, Wako (JP); Hidemasa Aoki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/657,071

(22) Filed: Mar. 13, 2015

(65) Prior Publication Data

US 2015/0276157 A1 Oct. 1, 2015

(30) Foreign Application Priority Data

Mar. 31, 2014 (JP) .................. 2014-072268

(51) Int. Cl.
| | |
|---|---|
| *B60Q 1/06* | (2006.01) |
| *F21S 8/10* | (2006.01) |
| *B60Q 1/00* | (2006.01) |
| *B62J 6/02* | (2006.01) |

(52) U.S. Cl.
CPC .......... *F21S 48/1104* (2013.01); *B60Q 1/0041* (2013.01); *B60Q 1/06* (2013.01); *B62J 6/02* (2013.01); *F21S 48/1154* (2013.01); *F21S 48/1159* (2013.01); *F21S 48/1233* (2013.01); *F21S 48/1241* (2013.01); *F21S 48/13* (2013.01); *F21S 48/15* (2013.01)

(58) Field of Classification Search
CPC .......... B60Q 1/0041; B60Q 1/06; B62J 6/02; F21S 48/1104; F21S 48/1154; F21S 48/1159; F21S 48/1233; F21S 48/1241; F21S 48/13; F21S 48/14; F21S 48/15
See application file for complete search history.

(56) References Cited

U.S. PATENT DOCUMENTS

| | | | |
|---|---|---|---|
| 2007/0025117 A1* | 2/2007 | Watanabe | ............ F21S 48/1159 362/545 |
| 2007/0058381 A1* | 3/2007 | Domoto | ............... B60Q 1/0041 362/475 |

FOREIGN PATENT DOCUMENTS

JP 2007-076567 3/2007

\* cited by examiner

*Primary Examiner* — Thomas M Sember
(74) *Attorney, Agent, or Firm* — Rankin, Hill & Clark LLP

(57) ABSTRACT

In a headlight of a motorcycle, a holder, first light sources and second light sources are arranged inside a lamp unit. The lamp unit is formed with a housing and an outer lens. The first light sources are main low beam light sources supported by the holder. The second light sources are subordinate low beam light sources that are supported independently by a housing other than the holder, the housing not permitting adjustment of the optical axis, and produce a smaller amount of light than the first light sources.

9 Claims, 11 Drawing Sheets

VEHICLE LAMP

BACKGROUND OF THE INVENTION

1. Field of the Invention

The present invention relates to a vehicle lamp that has a plurality of light sources and a holder in a lamp unit formed with a housing and a lens arranged therein and adjusts the optical axis of the light sources by tilting the holder.

2. Description of Related Art

Japanese Patent Laid-Open No. 2007-76567 discloses adjusting an optical axis (aiming) by sharing a holder among a plurality of light sources to support the light sources with the single holder. The optical axes of the plurality of light sources are simultaneously adjusted by tilting the single holder.

However, the technology disclosed in Japanese Patent Laid-Open No. 2007-76567 supports a plurality of light sources with a single holder. As a result, there is no flexibility in laying out each light source, making it likely that a vehicle lamp may be restricted in design. Further, all the light sources are supported by the holder. Therefore, in the prior art, the optical axes are adjusted even for those light sources whose adjustment is not required.

SUMMARY OF THE INVENTION

In light of the foregoing, it is an object of the present invention to provide a vehicle lamp that offers a simpler optical axis adjustment mechanism.

A vehicle lamp according to the present invention includes a plurality of light sources, a housing, a lens, and a holder. The lens is supported by the housing. The holder is arranged inside a lamp unit that is formed with the housing and the lens and adjusts optical axes of the light sources by tilting.

The plurality of light sources include first light sources and second light sources. The first light sources are supported by the holder. The second light sources produce a smaller amount of light than the first light sources. The second light sources are supported independently by a component other than the holder of the vehicle lamp, the component not permitting adjustment of an optical axis.

Accordingly, the plurality of light sources include first light sources serving as main light sources and second light sources serving as subordinate light sources that produce a smaller amount of light (that are lower in illuminance) than the main light sources. The optical axes of only the first light sources can be adjusted while the optical axes of the second light sources are not adjusted. As described above, doing without optical axis adjustment (aiming) of those light sources not likely to be affected by the optical axes (second light sources) provides a simpler optical axis adjustment mechanism.

In further accordance with the present invention, a first light source group made up of the plurality of first light sources and a second light source group made up of the plurality of second light sources are arranged inside the lamp unit. In this case, the first light source group has a reflector for each of the first light sources. Each of the reflectors is provided on a base plate. Further, the vehicle lamp further has a light guide member arranged inside the lamp unit and adapted to cover the first light source group and the second light source group from the side of the lens.

Accordingly, there is no need to form a reflector so as to match the shape of a light guide member. This provides improved flexibility in the shape of the light guide member, and by extension, improved design of the vehicle lamp. It should be noted that the light guide member should preferably be colored.

In further accordance with the present invention, a light shielding body is further provided in the lamp unit to adjust an irradiation area of the second light sources. The light shielding body is supported by the light guide member. The light shielding body reinforces the light guide member and allows the light guide member to more readily collect light from the second light sources.

In further accordance with the present invention, the first light sources and the second light sources are low beam light sources. High beam light sources are supported by the holder. The optical axes of the first light sources, i.e., low beam light sources, and the optical axes of the high beam light sources can be adjusted simultaneously.

In further accordance with the present invention, first light sources and the second light sources are arranged inside the lamp unit in such a manner as to sandwich the high beam light sources vertically. Accordingly, even if a low beam in a vertically extended shape is emitted from the vehicle lamp by using light from the first and second light sources, the optical axes of the first light sources and the optical axes of the high beam light sources can be readily adjusted with a compact structure.

BRIEF DESCRIPTION OF THE DRAWINGS

These and further features of the invention will be apparent with reference to the following description and drawings, wherein:

FIG. 4 is a perspective view of an extension, reflectors, a light shielding body, a first base plate, and so on.

DETAILED DESCRIPTION OF THE INVENTION

A detailed description will be given below of the vehicle lamp according to the present invention by citing a preferred embodiment and by referring to the accompanying drawings.

Figure 1:
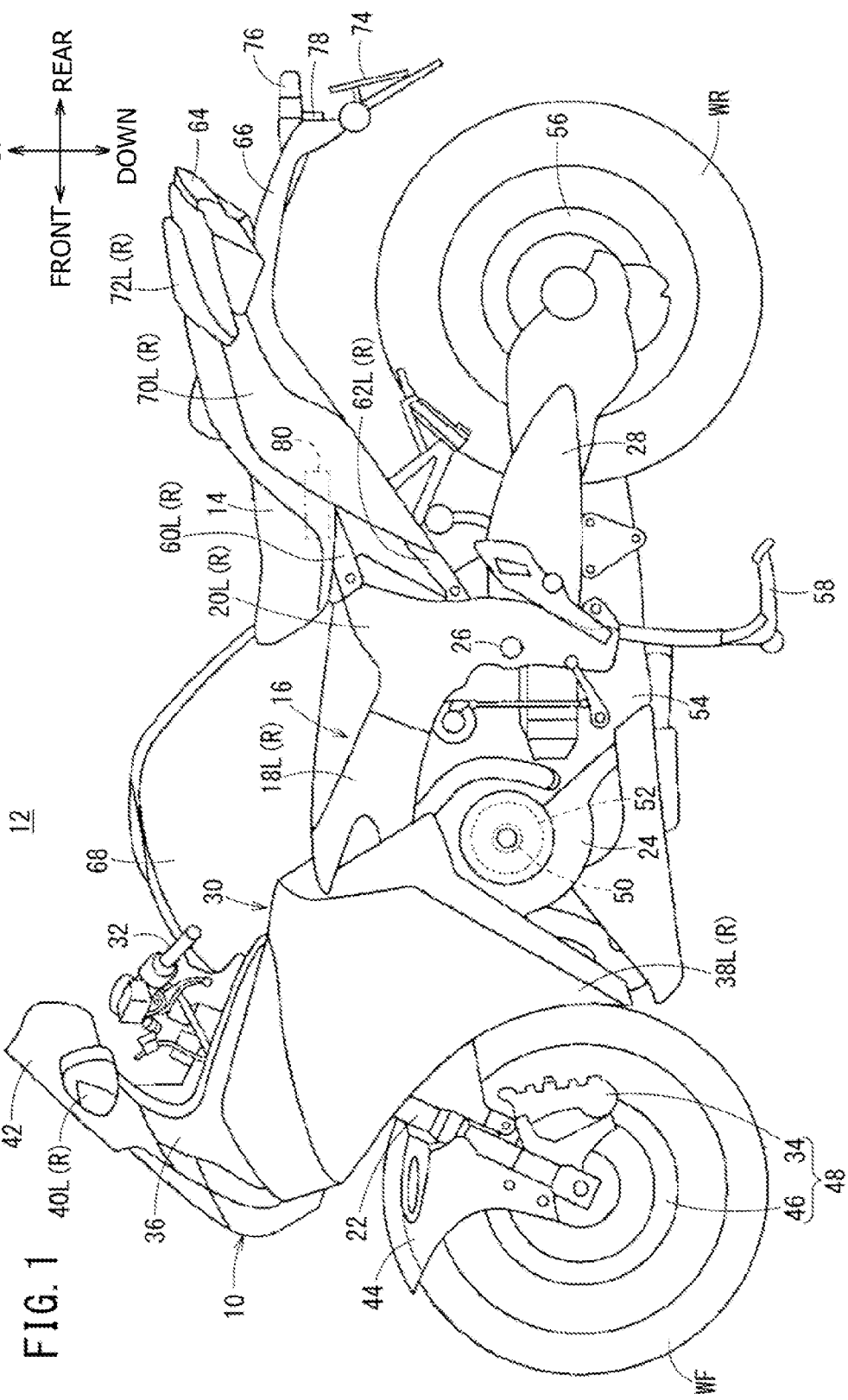
FIG. 1 is a left side view of a motorcycle having a headlight according to the present embodiment.
Figure 2:
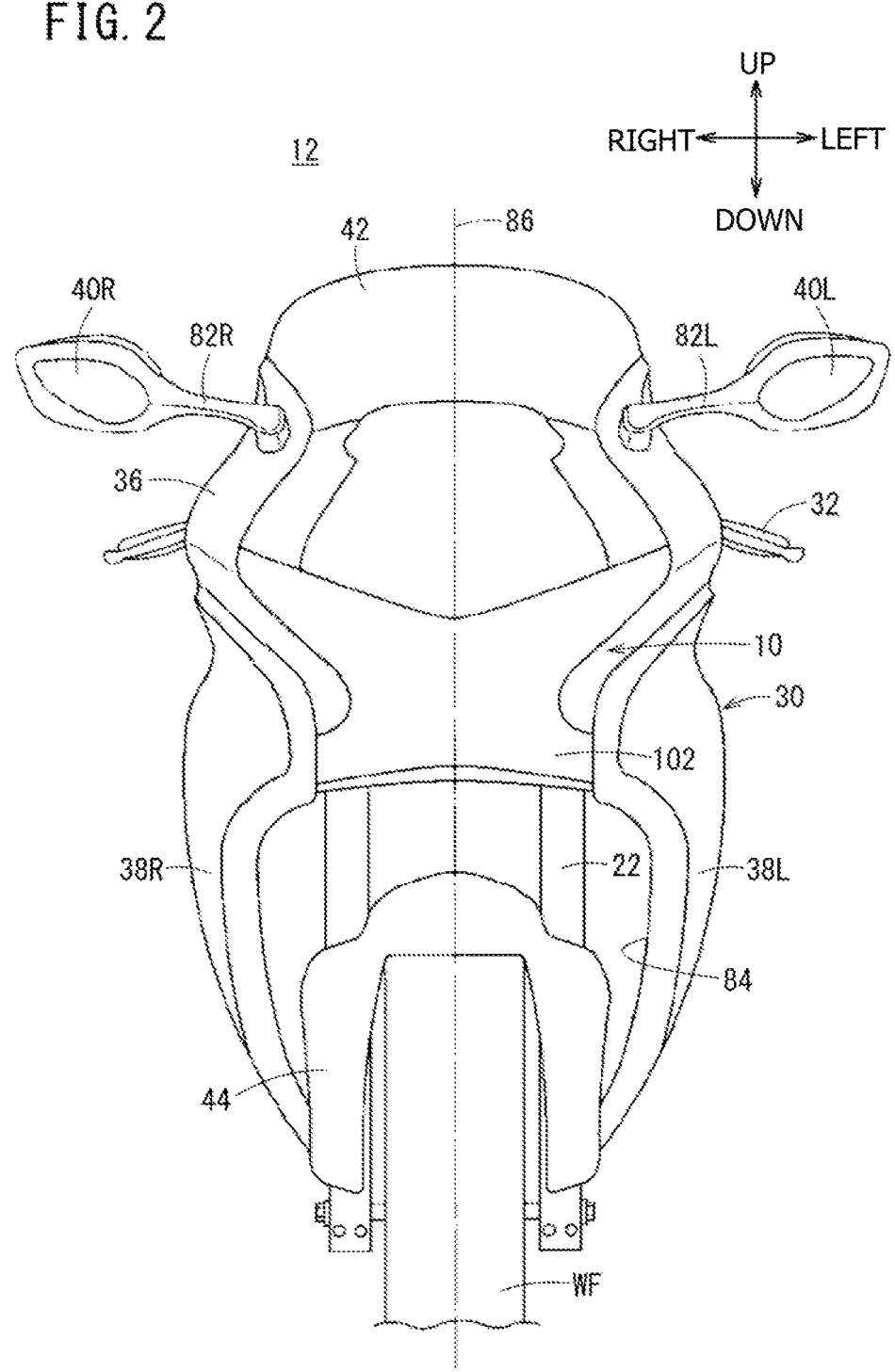
FIG. 2 is a front view of the motorcycle shown in FIG. 1.

FIG. 1 is a left side view of a motorcycle (vehicle) 12 having a headlight 10 serving as a vehicle lamp according to the present embodiment (hereinafter also referred to as the headlight 10 according to the present embodiment). FIG. 2 is a front view of the motorcycle 12. It should be noted that, unless otherwise stated, the longitudinal, horizontal, and vertical directions of the motorcycle 12 will be described relative to the direction as seen from the rider seated on a seat 14 of the motorcycle 12. Further, as for the mechanisms or components provided one on the left and another on the right of the vehicle body, letter L is added to the reference symbols of those provided on the left, and letter R is added to the reference symbols of those provided on the right.

A vehicle body frame 16 making up the motorcycle 12 has left and right main frames 18L and 18R and left and right pivot plates 20L and 20R. The left and right pivot plates 20L and 20R are coupled respectively to rear ends of the left and right main frames 18L and 18R. A front fork 22 is steerably supported by front ends of the main frames 18L and 18R. A transmission integrated engine 24 is supported by the main frames 18L and 18R and the pivot plates 20L and 20R. A swing arm 28 is vertically swingably supported by the pivot plates 20L and 20R via a pivot shaft 26.

The front side and both of the lateral sides of an upper portion of the front fork 22 are covered with a cowling 30. A bar handle 32 is attached to an upper end portion of the front fork 22. A front wheel WF and a brake caliper 34 are attached to a lower end portion of the front fork 22.

The cowling 30 includes a front cowl 36 and left and right side cowls 38L and 38R. The headlight 10 is attached to the front cowl 36. The side cowls 38L and 38R spread rearward and downward from the lateral sides of the front cowl 36. It should be noted that left and right front turning indicators 40L and 40R are attached to the front cowl 36, and that a wind screen 42 extends upward and diagonally rearward from an upper portion of the front cowl 36.

An upper portion of the front wheel WF is covered with a front fender 44 that is attached to the front fork 22. Further, the brake caliper 34 and a brake disk 46 attached integrally to the front wheel WF make up a front disk brake 48.

A crankshaft 50 and an AC generator 52 are provided on the engine 24. The crankshaft 50 extends in a vehicle width direction (in a horizontal direction) inside a crankcase. The AC generator 52 has its rotor attached to one end of the crankshaft 50 and its stator attached to the other end of the crankshaft 50.

The swing arm 28 has its front end portion attached to the pivot shaft 26 and its rear end portion attached to a rear wheel WR. A drive shaft (not shown) is accommodated in the swing arm 28. The drive shaft transmits power from a transmission 54 provided in a rear portion of the engine 24 to the rear wheel WR. It should be noted that a brake disk 56 making up a rear disk brake is attached integrally to the rear wheel WR. Further, a main stand 58 is attached to a lower end portion of the pivot plate 20L.

Left and right seat rails 60L and 60R and left and right subframes 62L and 62R are attached to the upper sides of rear portions of the pivot plates 20L and 20R, respectively. Rear end portions of the seat rails 60L and 60R and the subframes 62L and 62R are coupled together.

The seat 14 and a rear combination lamp 64 are attached to the seat rails 60L and 60R. The rear combination lamp 64 is arranged in the rear of the seat 14. A rear fender 66 is attached to the seat rails 60L and 60R and the subframes 62L and 62R. The rear fender 66 covers the upper side of the rear wheel WR.

It should be noted that a fuel tank 68 is provided on top of the vehicle body frame 16 and in front of the seat 14. Further, the bottom sides of the lateral portions of the seat 14 are covered with left and right side covers 70L and 70R. Left and right grab rails 72L and 72R are provided in the rear of the seat 14. The grab rails 72L and 72R are grabbed by a fellow passenger seated on a rear portion of the seat 14.

Further, a license plate 74, a license plate lamp 76, and a reflex reflector 78 are attached to the rear fender 66.

A regulator 80 is arranged between the left and right seat rails 60L and 60R and under the seat 14 to control the output of the AC generator 52. The regulator 80 is connected to an unshown battery.

As illustrated in FIG. 2, the headlight 10 in the approximate shape of a letter X in front view is arranged at a lower center portion of the front cowl 36 and between the left and right side cowls 38L and 38R.

The front turning indicators 40L and 40R are attached respectively to upper left and right portions of the front cowl 36, respectively, via turning indicator support members 82L and 82R that extend leftward and rightward. Further, part of the front fork 22 and the front fender 44 described above is arranged inside an opening 84 that is formed by the left and right side cowls 38L and 38R and the headlight 10. It should be noted that the motorcycle 12 is, in front view in FIG. 2, approximately horizontally symmetrical with respect to a centerline 86 that passes through the center of the motorcycle 12 in the vehicle width direction and extends perpendicularly.

A description will be given next of the configuration of the headlight 10 according to the present embodiment with reference to FIGS. 3 to 11.

Figure 3:
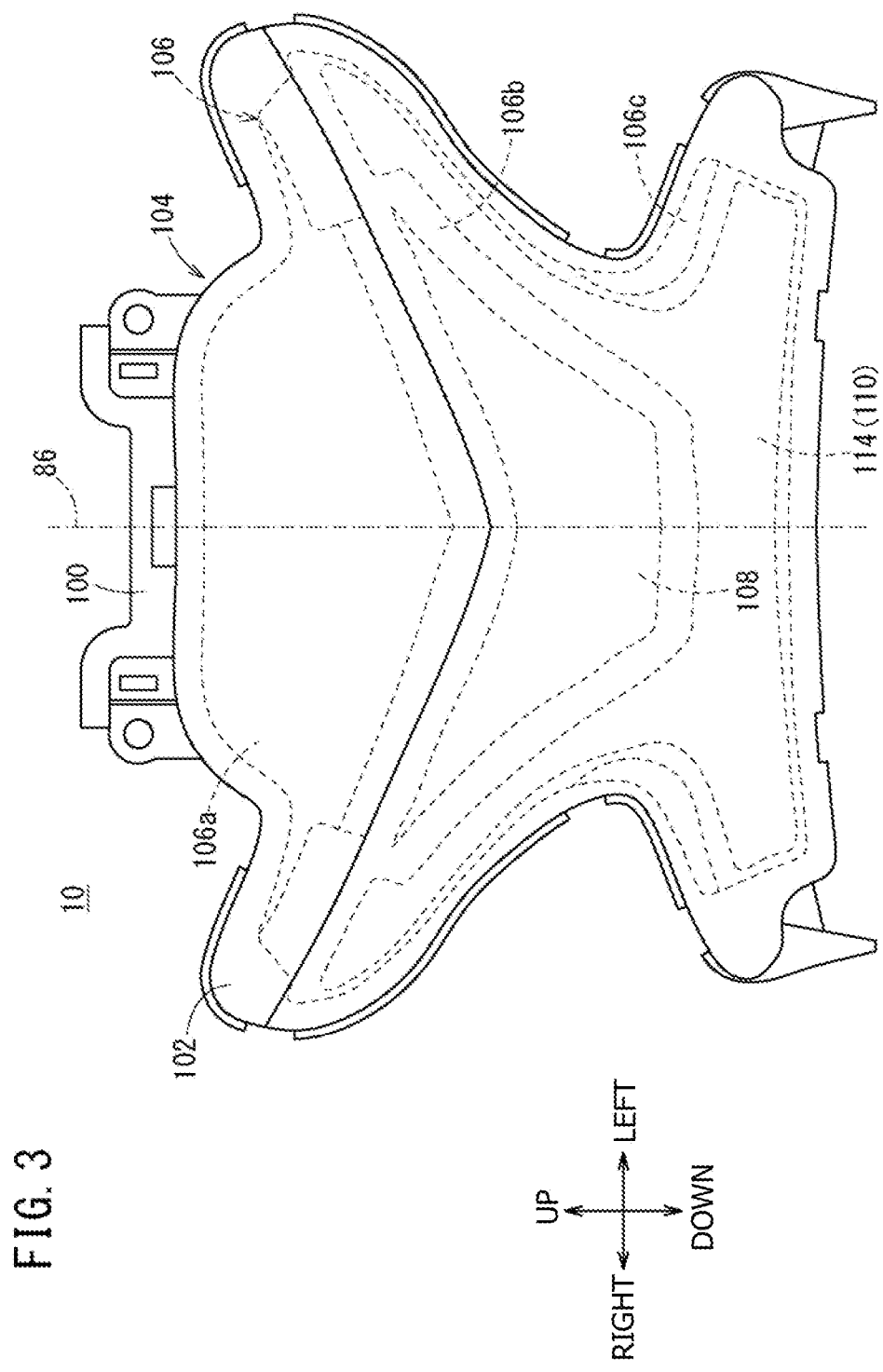
FIG. 3 is a front view of the headlight shown in FIGS. 1 and 2.
Figure 4:
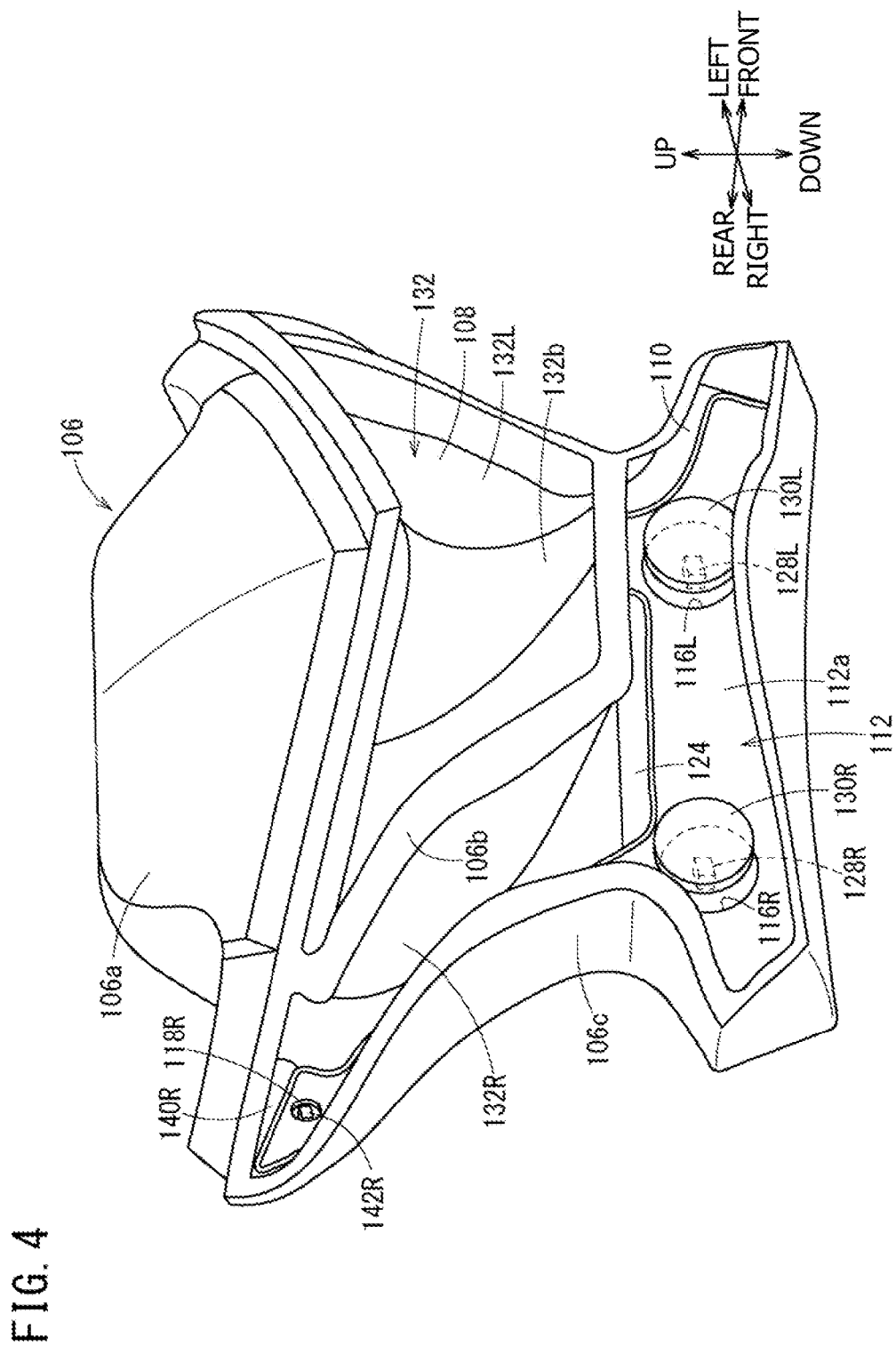
Figure 5:
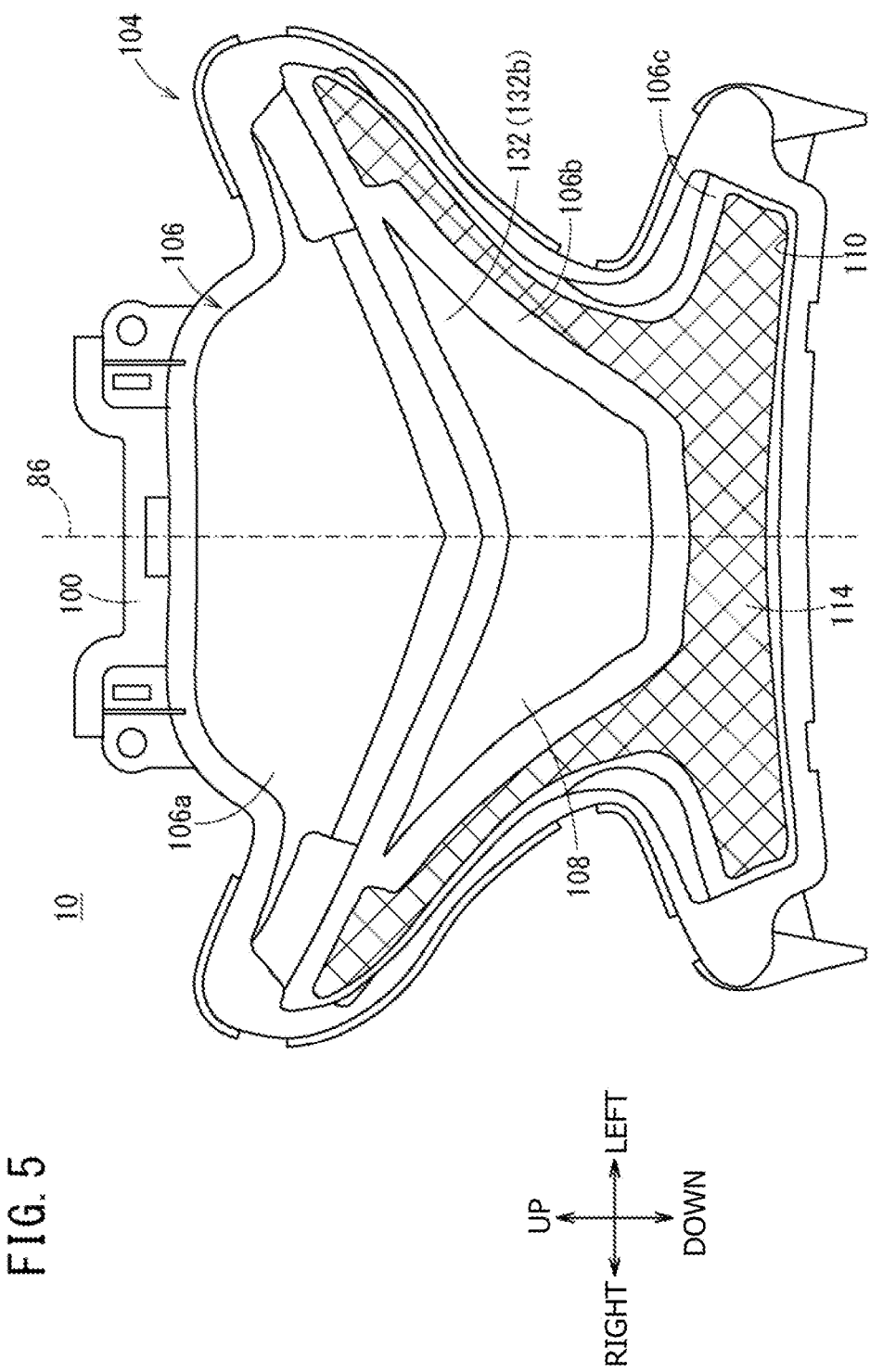
FIG. 5 is a front view illustrating the headlight shown in FIG. 3 with an outer lens removed therefrom.

FIG. 3 is a front view of the headlight 10. FIG. 4 is a perspective view illustrating some of the components inside the headlight 10. FIG. 5 is a front view illustrating the headlight 10 with an outer lens 102 removed therefrom.

The headlight 10 has a housing 100 on the rear side and the outer lens (lens) 102. The outer lens 102 covers the housing 100 from the front and permits transmission of light. Therefore, the outer lens 102 is supported by the housing 100, and the housing 100 and the outer lens 102 make up a lamp unit 104 adapted to illuminate in front of the motorcycle 12.

The headlight 10 has a structure approximately horizontally symmetrical with respect to the centerline 86 that runs vertically through the motorcycle 12 including the headlight 10 (refer to FIGS. 1 and 2). Therefore, the outer lens 102 is formed in the shape of a letter X horizontally symmetrical with respect to the centerline 86 in front view in FIGS. 2 and 3.

That is, an upper portion of the outer lens 102 is in the shape of up-turned eyes with their outer corners turning up, and a lower portion thereof extends diagonally downward. It should be noted that part of the outer lens 102 is covered with the front cowl 36 (refer to FIGS. 1 and 2).

In FIG. 5, an extension 106 is attached to the front of the housing 100 for design purposes to provide improved visibility of the headlight 10. The extension 106 is a member made of resin formed in the approximate shape of a letter X to match the outer lens 102.

That is, the extension 106 includes an upper portion 106a, a first frame body 106b, and a second frame body 106c. The upper portion 106a covers an upper front portion of the housing 100. The first frame body 106b extends downward from the lower side of the upper portion 106a in the approximate shape of a letter V, thus forming an opening 108 in the approximate shape of a letter V. The second frame body 106c extends downward from both ends of the lower side of the upper portion 106a, thus forming an opening 110 in the approximate shape of a letter X together with the first frame body 106b on the inside. That is, the first frame body 106b is formed on the inside of the second frame body 106c via the opening 110 in the approximate shape of a letter X. The opening 108 in the approximate shape of a letter V is formed with the lower side of the upper portion 106a and the inner circumference of the first frame body 106b.

Further, the upper portion 106a of the extension 106 is provided in proximity to the upper portion of the outer lens 102. The second frame body 106c extends downward from the upper portion 106a so as to run along the areas where the housing 100 is fitted to the outer lens 102. It should be noted that the extension 106 may be attached to the housing 100 in a variety of ways, including engagement of the extension 106 with an engagement section (not shown) provided on the housing 100 and screwing of the extension 106 to the housing 100.

Figure 7:
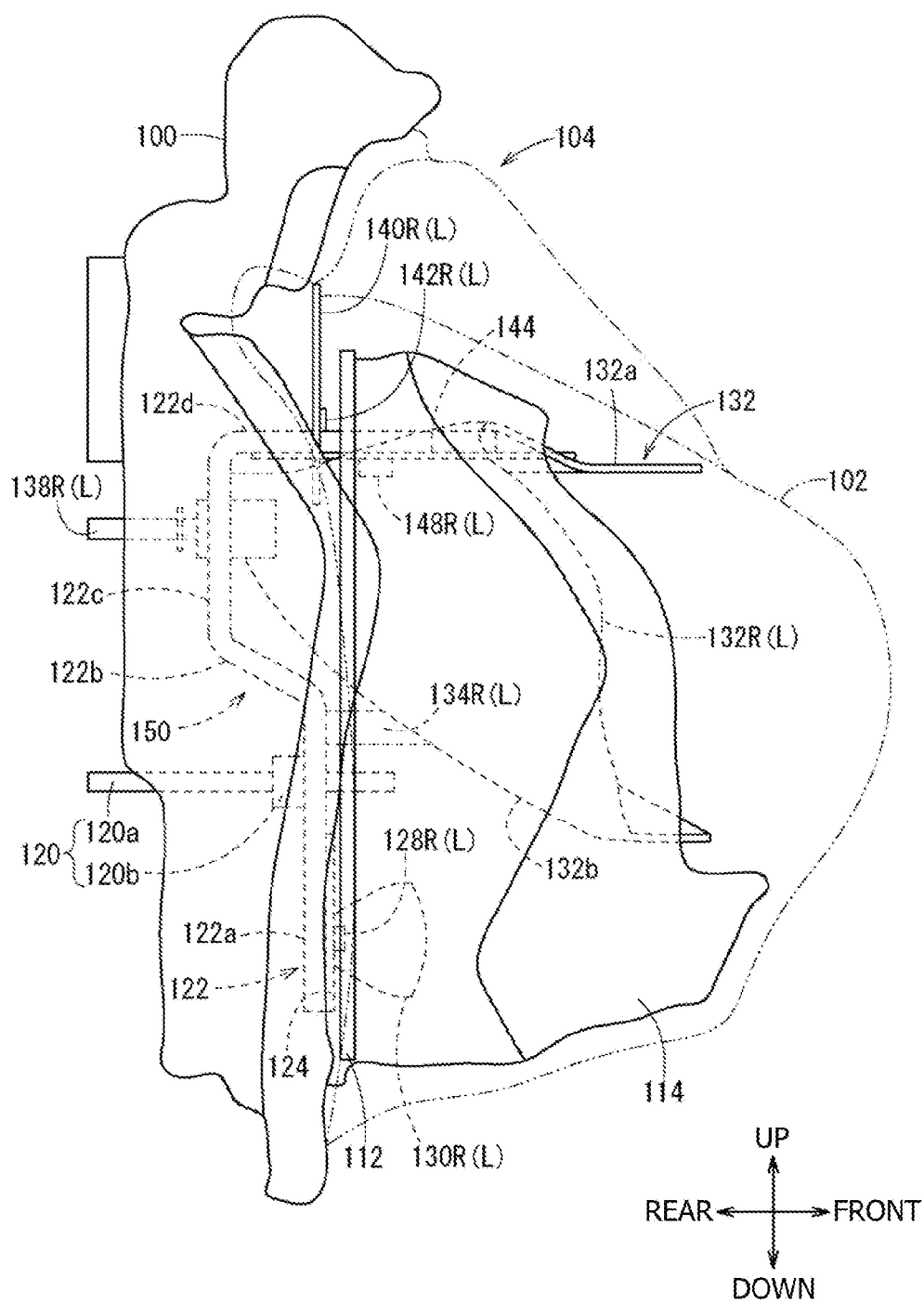
FIG. 7 is a right side view of the headlight shown in FIG. 3 with the outer lens and the extension removed therefrom.

An inner lens 114 in the approximate shape of a letter X is attached to the opening 110 of the extension 106. That is, the inner lens 114 is supported by being fitted to the extension 106 so as to cover the opening 110. Further, the inner lens 114 is a colored or colorless light guide member, and a light shielding body 112 is supported on a rear face of the inner lens 114 as illustrated in FIG. 7.

It should be noted that the light shielding body 112, first light sources 128L and 128R, second light sources 142L and 142R, third light sources 148L and 148R, and low beam reflectors 130L and 130R, which will be described later, are either invisible or not readily visible from outside because of the inner lens 114. Further, a high beam reflector 132 is arranged on the inside of the opening 108 in front view in FIG. 5.

When the inner lens 114 is removed from the extension 106, the light shielding body 112 is also removed together with the inner lens 114. It should be noted that the inner lens 114 is not shown in FIG. 6 for convenience of description, and that the light shielding body 112 is shown to be arranged inside the opening 110 in FIG. 5.

Figure 6:
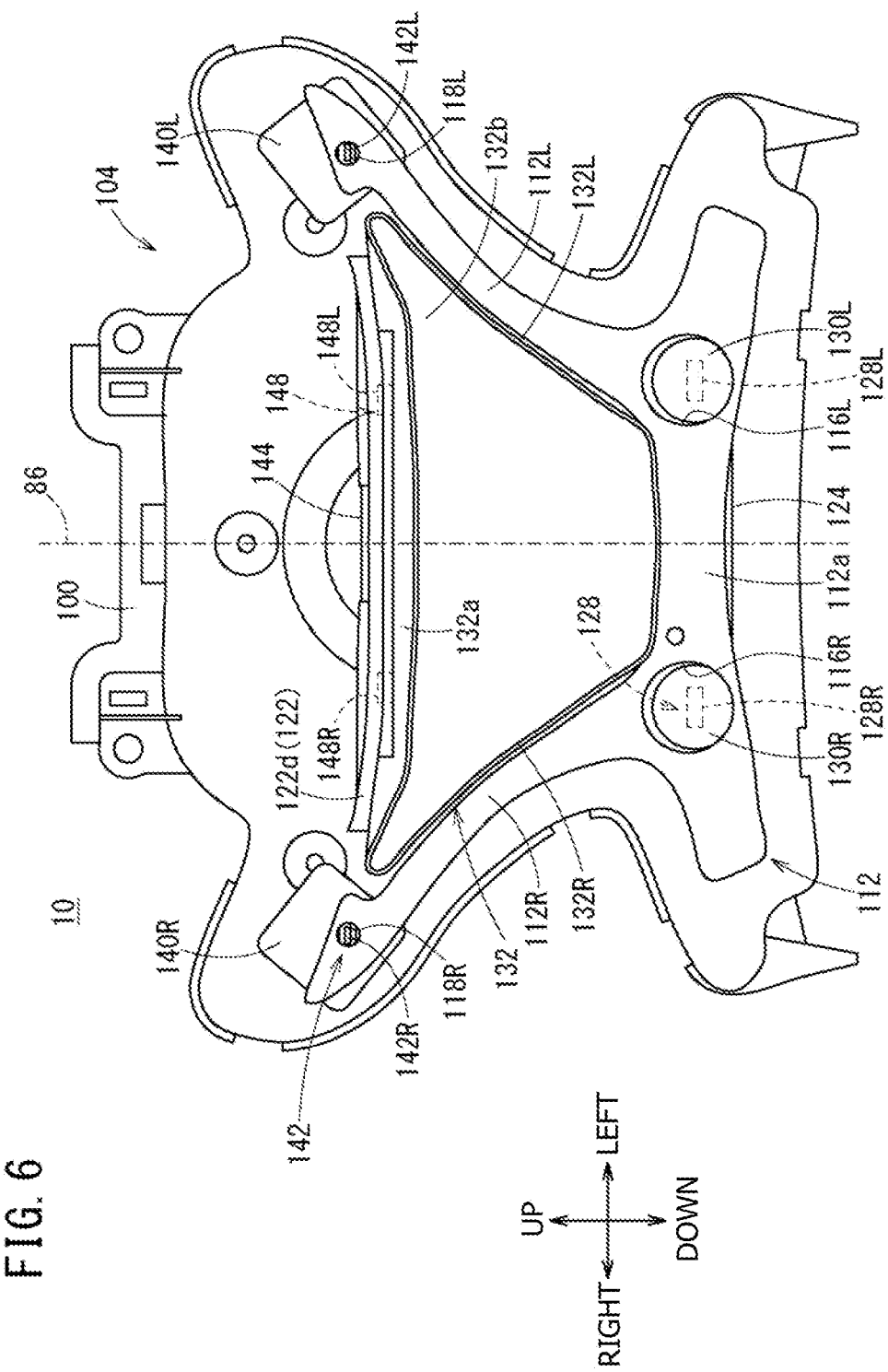
FIG. 6 is a front view illustrating the headlight shown in FIG. 5 with an inner lens and the extension removed therefrom.

As illustrated in FIGS. 4 and 6, the light shielding body 112 includes a lower portion 112a, a left tilting portion 112L, and a right tilting portion 112R. The lower portion 112a extends horizontally. The left tilting portion 112L extends diagonally leftward and upward from the lower portion 112a along the opening 110. The right tilting portion 112R extends diagonally rightward and upward from the lower portion 112a along the opening 110. Then, holes 116L and 116R of a relatively large diameter are formed respectively at an intersection between the lower portion 112a and the left tilting portion 112L and that between the lower portion 112a and the right tilting portion 112R. On the other hand, holes 118L and 118R of a relatively small diameter are formed respectively at tip portions of the left tilting portion 112L and the right tilting portion 112R close to the upper portion 106a.

As illustrated in FIG. 7, the housing 100 has a bar-shaped optical axis adjustment section 120 that longitudinally penetrates the housing 100. A tip portion of the optical axis adjustment section 120 is coupled to a holder 122 that extends vertically inside the housing 100 as illustrated in FIG. 7 and FIGS. 9 to 11.

Figure 8:
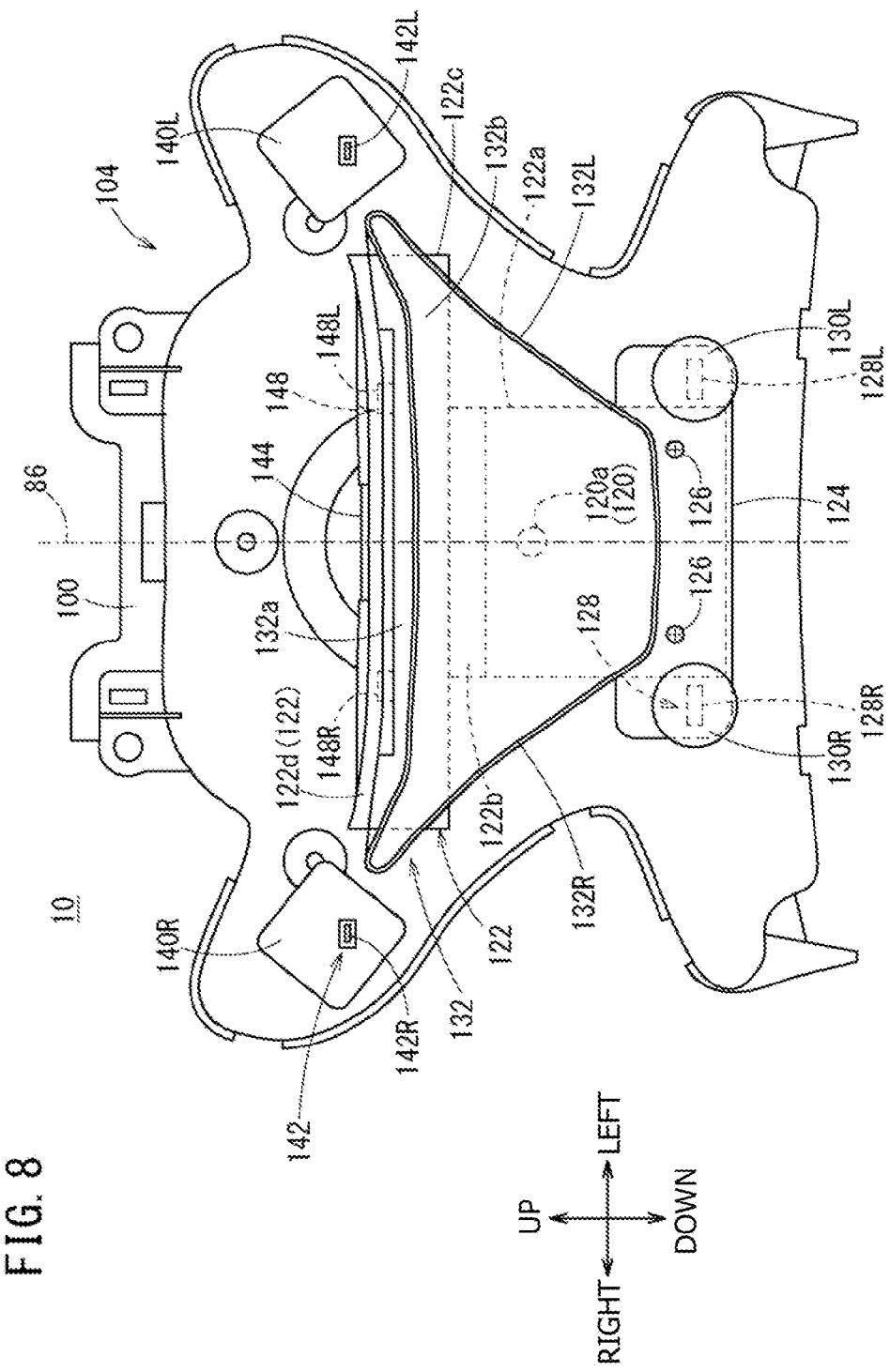
FIG. 8 is a front view of the headlight shown in FIG. 6 with the light shielding body removed therefrom.
Figure 9:
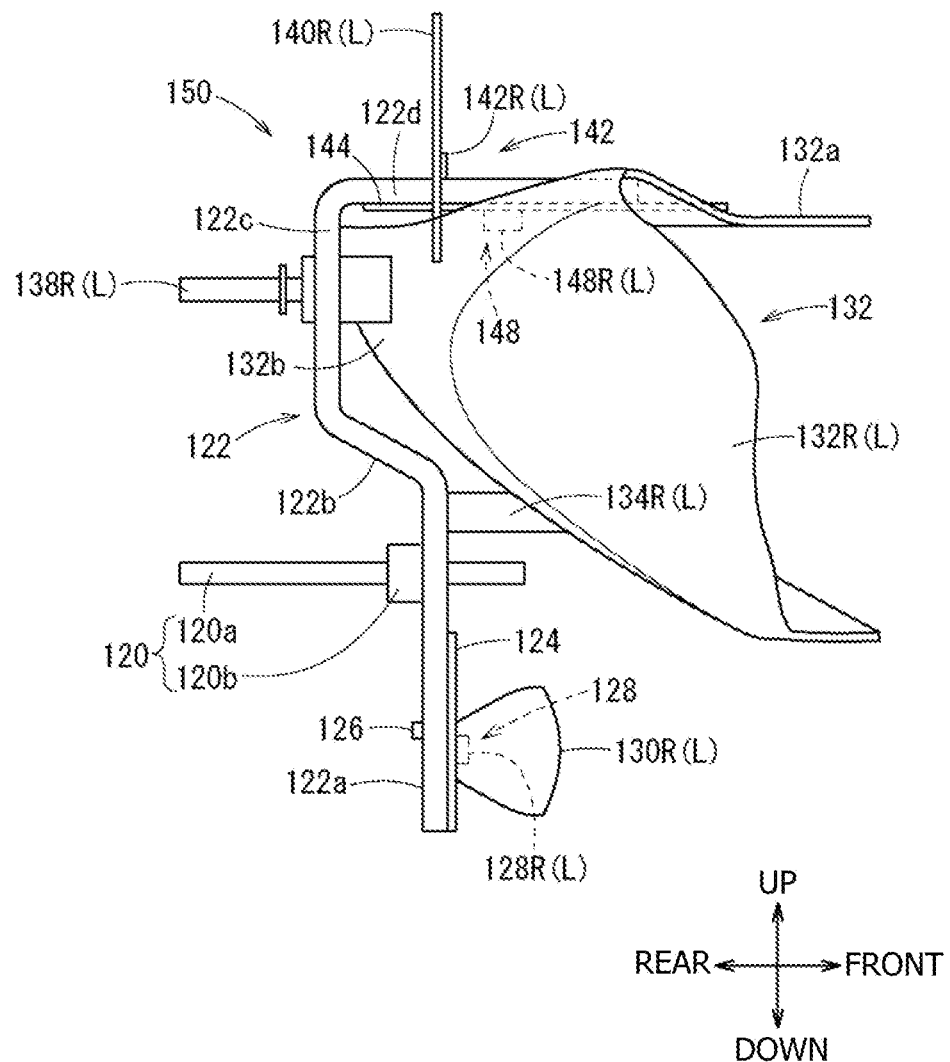
FIG. 9 is a right side view of an optical axis adjustment mechanism of the headlight shown in FIGS. 1 and 2.
Figure 10:
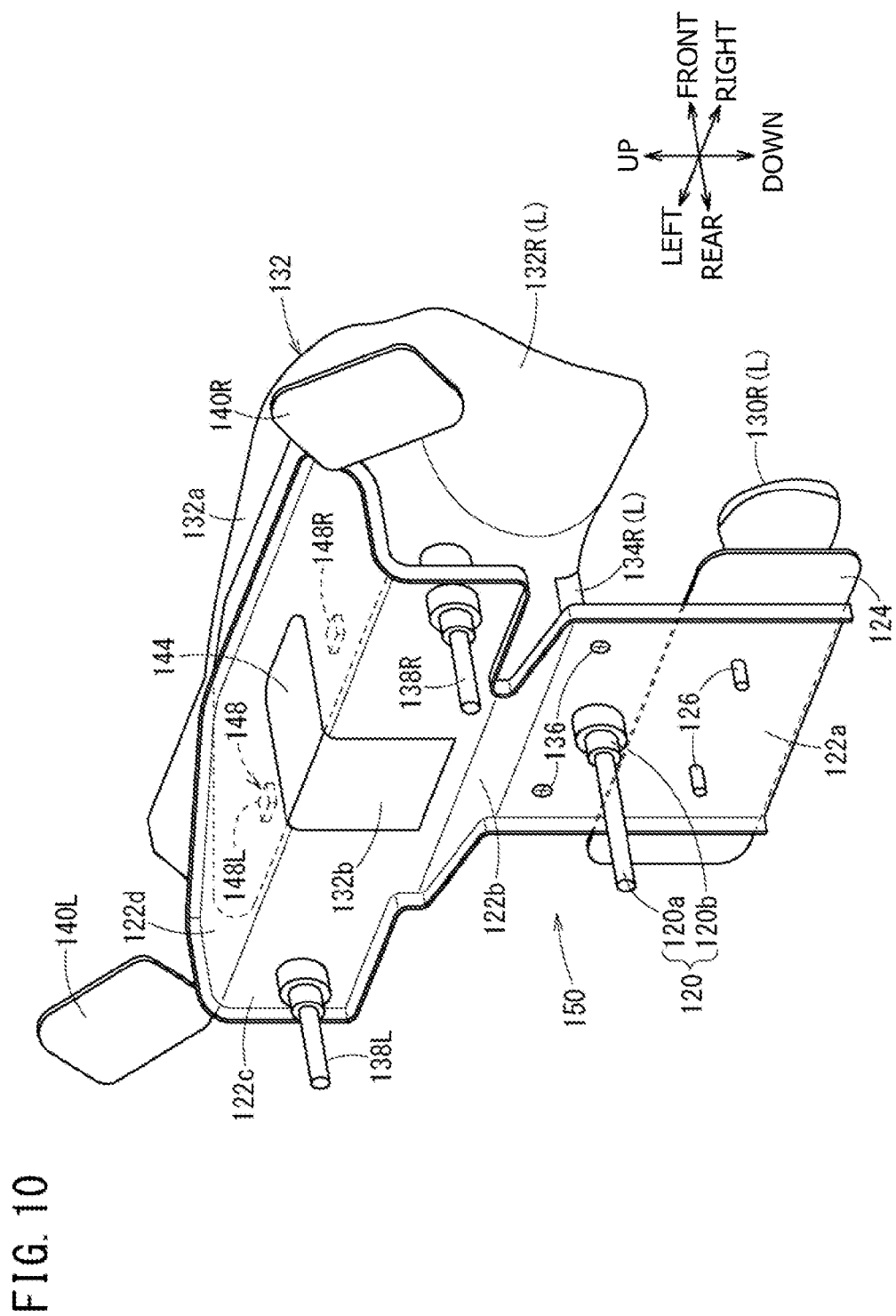
FIG. 10 is a perspective view of the optical axis adjustment mechanism shown in FIG. 9.
Figure 11:
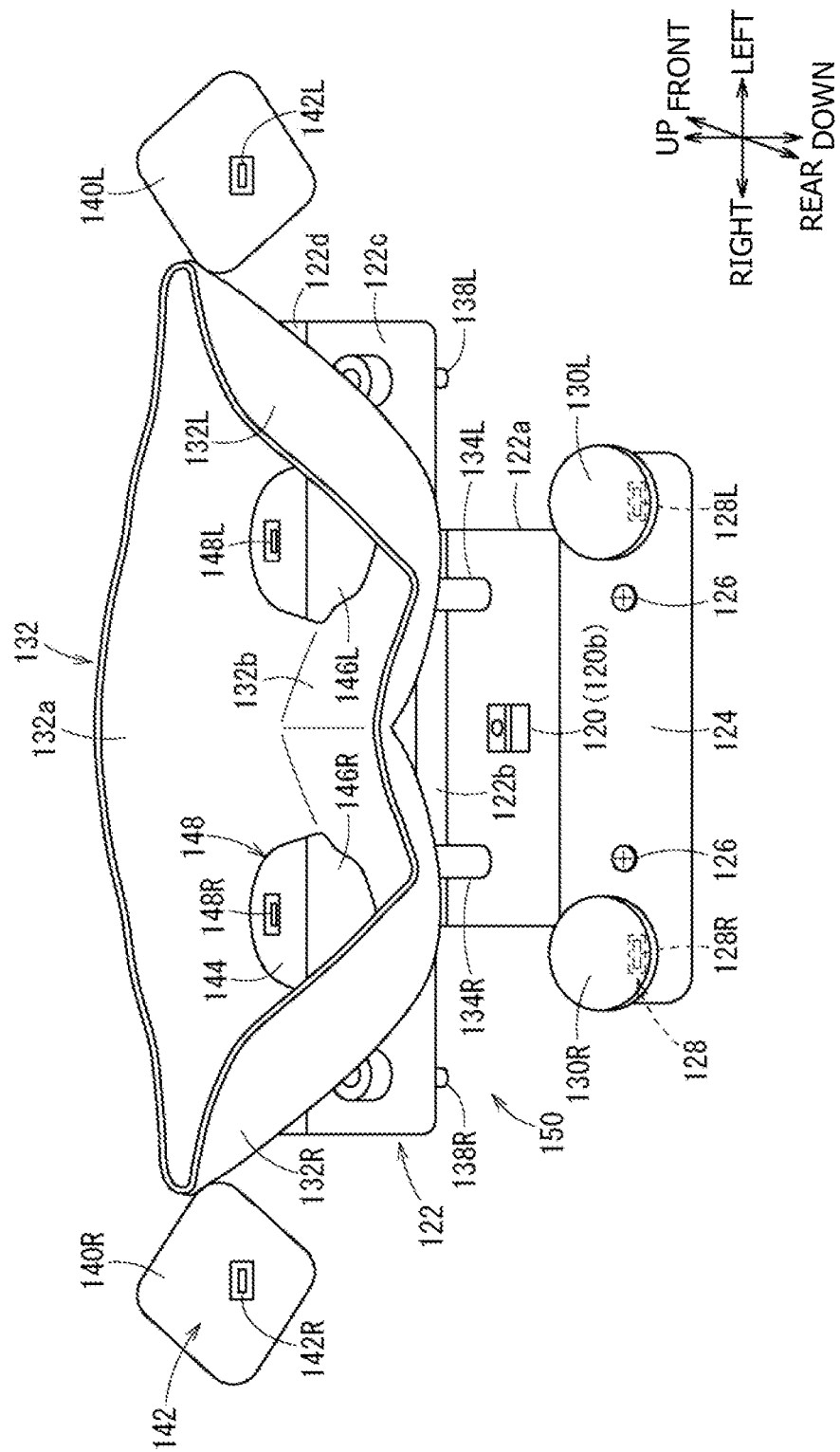
FIG. 11 is a perspective view of the optical axis adjustment mechanism shown in FIG. 9.

The holder 122 is a plate-shaped member in the approximate shape of a letter T that is horizontally symmetrical with respect to the centerline 86 as illustrated in the front view of FIG. 8 and in the perspective views of FIGS. 10 and 11. That is, the holder 122 has a plate-shaped lower end portion 122a as illustrated in FIGS. 7 to 11. The tip portion of the optical axis adjustment section 120 is coupled to the lower end portion 122a. The lower end portion 122a extends vertically. A first coupling section 122b extends diagonally upward and rearward from an upper end of the lower end portion 122a. A second coupling section 122c extends upward from an upper end of the first coupling section 122b. The second coupling section 122c is wider than the lower end portion 122a and the first coupling section 122b. An upper end of the second coupling section 122c is formed as an upper end portion 122d that bends and extends forward.

A first base plate 124 is fastened to and supported by the lower side of a front face of the lower end portion 122a with screws 126. The first base plate 124 extends horizontally. The first base plate 124 is fastened to the lower end portion 122a in an upright position. The first light sources 128L and 128R such as LEDs are arranged at both ends of a front face of the first base plate 124 so as to be opposed to the holes 116L and 116R of a large diameter, respectively. The reflectors 130L and 130R in the approximate shape of a hemisphere are arranged at both ends of the first base plate 124 so as to be opposed to the holes 116L and 116R and cover the first light sources 128L and 128R, respectively.

In this case, the first light sources 128L and 128R and the reflectors 130L and 130R are arranged on the first base plate 124 so as to be approximately concentric with the holes 116L and 116R in front view in FIG. 6, so that arc areas of the reflectors 130L and 130R cover the first light sources 128L and 128R, respectively, and so that spreading areas thereof face forward.

The two first light sources 128L and 128R are low beam light sources of the headlight 10. A first light source group 128 includes the low beam first light sources 128L and 128R and the reflectors 130L and 130R. In this case, light emitted from the first light sources 128L and 128R enters the inner lens 114 via the reflectors 130L and 130R. Incident light is guided by the inner lens 114, thus allowing a low beam in the approximate shape of a letter X and in the color of the inner lens 114 to be shined forward via the outer lens 102.

Further, the holder 122 fastens and supports the reflector 132 that spreads forward. More specifically, rods 134L and 134R that extend rearward from a lower portion of a rear face of the reflector 132 are fastened to the lower end portion 122a of the holder 122 with screws 136. On the other hand, an upper portion of the rear face of the reflector 132 is supported by bar-shaped support members 138L and 138R that longitudinally penetrate the housing 100 and the second coupling section 122c.

The reflector 132 runs along the light shielding body 112 and the upper end portion 122d of the holder 122 in front view in FIGS. 5, 6, and 8 and is arranged inside the housing 100 so as to be opposed to the opening 108. More specifically, the reflector 132 includes an upper face portion 132a, a curved face portion 132b, a left extension portion 132L, and a right extension portion 132R as illustrated in FIGS. 4 to 11. The upper face portion 132a is in the approximate shape of a flat plate and runs along the upper end portion 122d. The curved face portion 132b bends toward the front and diagonally downward from a rear end of the upper end portion 122d. The left extension portion 132L extends forward along the left tilting portion 112L of the light shielding body 112. The right extension portion 132R extends forward along the right tilting portion 112R.

Second base plates 140L and 140R in an approximately rectangular shape are fastened to and supported by the housing 100 so as to be upright vertically near the left and right ends of the upper end portion 122d. The second light sources 142L and 142R, such as LEDs, are arranged respectively on front faces of the second base plates 140L and 140R so as to be opposed to the holes 118L and 118R of a small diameter. In this case, the second light sources 142L and 142R are arranged respectively on the second base plates 140L and 140R so as to be approximately concentric with the holes 118L and 118R in front view in FIG. 6.

The two second light sources 142L and 142R are low beam light sources of the headlight 10 as are the first light sources 128L and 128R and make up a second light source group 142. Further, the second light sources 142L and 142R produce a smaller amount of light than the first light sources 128L and 128R. In this case, light emitted from the second light sources 142L and 142R enters the inner lens 114 and are guided by the inner lens 114, thus allowing a low beam in the approximate shape of a letter X and in the color of the inner lens 114 to be shined forward via the outer lens 102.

It should be noted, however, that the amount of light produced from the second light sources 142L and 142R is smaller than that produced from the first light sources 128L and 128R. Therefore, the low beam in the approximate shape of a letter X shined forward from the headlight 10 is formed primarily by light produced from the first light sources 128L and 128R. That is, the first light sources 128L and 128R making up the first light source group 128 are the main light sources of the low beam. On the other hand, the second light sources 142L and 142R making up the second light source group 142 are the subordinate or secondary light sources of the low beam.

A third base plate 144 is fastened to and supported by a bottom face of the upper end portion 122d so as to be opposed to the upper face portion 132a of the reflector 132. Openings 146L and 146R are formed, one on the left and another on the right of a coupling area between the upper face portion 132a and the curved face portion 132b of the reflector 132. The third light sources 148L and 148R, such as LEDs, are arranged on a bottom face of the third base plate 144 so as to be opposed to the openings 146L and 146R, respectively.

The two third light sources 148L and 148R are high beam light sources of the headlight 10 and make up a third light source group 148. In this case, light emitted from the third light sources 148L and 148R is shined on the curved face portion 132b of the reflector 132 via the openings 146L and 146R and reflected forward, thus causing light to be shined forward via the outer lens 102 as a high beam.

It should be noted that, as illustrated in FIGS. 6, 8, and 9, the second light source group 142 (second light sources 142L and 142R), the third light source group 148 (third light sources 148L and 148R), and the first light source group 128 (first light sources 128L and 128R and reflectors 130L and 130R) are arranged in this order from top to bottom inside the headlight 10. Therefore, the first light sources 128L and 128R and the second light sources 142L and 142R serving as low beam light sources are arranged so as to vertically sandwich the third light sources 148L and 148R serving as high beam light sources inside the lamp unit 104.

In the headlight 10 according to the present embodiment configured as described above, the adjustment of the optical axes (aiming) of the first light sources 128L and 128R and the third light sources 148L and 148R is conducted in the following manner.

The optical axis adjustment section 120, the holder 122, and the support members 138L and 138R make up an optical axis adjustment mechanism 150 adapted to adjust the optical axes of the first light sources 128L and 128R and the third light sources 148L and 148R. In this case, the optical axis adjustment section 120 includes a bar-shaped aiming bolt 120a and an adjustment section 120b. The aiming bolt 120a longitudinally penetrates the housing 100. The adjustment section 120b is fastened to the lower end portion 122a of the holder 122 and screws onto a threaded groove (no shown) formed on a tip portion of the aiming bolt 120a.

Here, when the rider of the motorcycle 12 turns the aiming bolt 120a that protrudes rearward from the housing 100, the adjustment section 120b that is screwed on the threaded groove of the aiming bolt 120a is longitudinally displaced. In this case, the support members 138L and 138R penetrate an upper portion of the holder 122 and the second coupling section 122c and are coupled to the reflector 132. Therefore, the holder 122 including the lower end portion 122a adapted to fasten the adjustment section 120b tilts (rotates) as a whole about the connection points between the second coupling section 122c and the support members 138L and 138R as the adjustment section 120b is displaced longitudinally. Further, the reflector 132 is coupled to the holder 122 so that the reflector 132 tilts integrally with the holder 122.

As described earlier, the first base plate 124 is fastened to the lower end portion 122a, and the third base plate 144 is fastened to the upper end portion 122d. Therefore, if the holder 122 and the reflector 132 tilt integrally as a result of the turning of the aiming bolt 120a by the rider, this changes the optical axes of the first light sources 128L and 128R arranged on the first base plate 124, the optical axes of the third light sources 148L and 148R arranged on the third base plate 144, and the positions of the reflectors 130L and 130R that are arranged on the first base plate 124 so as to cover the first light sources 128L and 128R. Therefore, the rider can readily adjust the optical axes of the first light sources 128L and 128R and the third light sources 148L and 148R by turning the aiming bolt 120a.

On the other hand, the second base plates 140L and 140R are fastened to a front face of the housing 100 independently of the first base plate 124 and the third base plate 144. The housing 100 is a component that does not permit adjustment of the optical axis in the headlight 10. Therefore, the second light sources 142L and 142R are arranged inside the lamp unit 104 so as not to permit adjustment of the optical axes.

As described above, in the headlight 10 according to the present embodiment, the plurality of light sources in the lamp unit 104 include the first light sources 128L and 128R serving as main low beam light sources, the second light sources 142L and 142R serving as low beam subordinate light sources that produce a smaller amount of light (that are lower in illuminance) than the main light sources, and the third light sources 148L and 148R serving as high beam light sources.

Then, in the present embodiment, the first light sources 128L and 128R and the third light sources 148L and 148R permit adjustment of the optical axes (aiming), whereas the second light sources 142L and 142R are not subjected to optical axis adjustment.

As described above, doing without optical axis adjustment of the second light sources 142L and 142R that are not likely to be affected by the optical axes provides the simpler optical axis adjustment mechanism 150 in the lamp unit 104. Further, it is possible to simultaneously adjust the optical axes of the first light sources 128L and 128R, low beam light sources, and the third light sources 148L and 148R, high beam light sources.

Still further, in the present embodiment, the reflectors 130L and 130R, provided independently of the inner lens 114 in such a manner as to cover the first light sources 128L and 128R, are arranged on the first base plate 124. The first light source group 128 including the first light sources 128L and 128R and the reflectors 130L and 130R and the second light source group 142 including the second light sources 142L and 142R are covered with the inner lens 114 from the front.

As a result, there is no need to form the reflectors 130L and 130R to match the shape of the inner lens 114. This contributes to greater flexibility in the shape of the inner lens 114, and by extension, improved design of the headlight 10. It should be noted that so long as the inner lens 114 is a colored light guide member, it is possible to shine a low beam of a desired color and shape forward via the outer lens 102.

Supporting the light shielding body 112 on the rear face of the inner lens 114 provides greater mechanical strength to the inner lens 114.

Further, the holes 116L and 116R and the holes 118L and 118R are formed in the light shielding body 112. The holes 116L and 116R are opposed, respectively, to the first light sources 128L and 128R and the reflectors 130L and 130R. The holes 118L and 118R are opposed, respectively, to the second light sources 142L and 142R. This makes it possible to adjust the irradiation area of light shined from the first light sources 128L and 128R and the second light sources 142L and 142R onto the inner lens 114 by adjusting the sizes of the holes 116L, 116R, 118L, and 118R. Moreover, the light can be readily collected onto the inner lens 114.

Further, the first light sources 128L and 128R and the second light sources 142L and 142R are arranged inside the lamp unit 104 so as to vertically sandwich the third light sources 148L and 148R. As a result, even if a vertically extending low beam in the approximate shape of a letter X is shined forward from the headlight 10 by using light from the first light sources 128L and 128R and the second light sources 142L and 142R, the optical axes of the first light sources 128L and 128R and the third light sources 148L and 148R can be readily adjusted with a compact structure.

A description has been given above of the present invention with reference to a preferred embodiment. However, the technical scope of the present invention is not limited to the scope described in the above embodiment. It is apparent to those skilled in the art that various changes and modifications can be made to the above embodiment. It is apparent from the description of the claims that the technical scope of the present invention also includes embodiments with such changes or modifications. Further, the reference symbols in round brackets appearing in the claims have been added to imitate those given in the accompanying drawings for easy understanding of the present invention. The present invention is not to be interpreted as being limited to the elements with the reference symbols.

DESCRIPTION OF REFERENCE SYMBOLS

10 . . . Headlight
12 . . . Motorcycle
100 . . . Housing
102 . . . Outer lens
104 . . . Lamp unit
106 . . . Extension
108, 110, 146L, 146R . . . Opening
112 . . . Light shielding body
112a . . . Lower portion
112L . . . Left tilting portion
112R . . . Right tilting portion
114 . . . Inner lens
116L, 116R, 118L, 118R . . . Hole
120 . . . Optical axis adjustment section
120a . . . Aiming bolt
120b . . . Adjustment section
122 . . . Holder
122a . . . Lower end portion
122b . . . First coupling section
122c . . . Second coupling section
122d . . . Upper end portion
124 . . . First base plate
128 . . . First light source group
128L, 128R . . . First light source
130L, 130R, 132 . . . Reflector
138L, 138R . . . Support member
140L, 140R . . . Second base plate
142 . . . Second light source group
142L, 142R . . . Second light source
144 . . . Third base plate
148 . . . Third light source group
148L, 148R . . . Third light source
150 . . . Optical axis adjustment mechanism

What is claimed is:

1. A vehicle lamp comprising:
a plurality of light sources;
a housing;
a lens supported by the housing; and
a holder arranged inside a lamp unit that is formed with the housing and the lens to adjust optical axes of the light sources by tilting,
wherein the plurality of light sources include first light sources supported by the holder and second light sources that produce a smaller amount of light than the first light sources, and
the second light sources are supported independently by a component other than the holder of the vehicle lamp, the component not permitting adjustment of an optical axis,
wherein the first light sources and the second light sources are low beam light sources, and high beam light sources are supported by the holder,
wherein the first light sources and the second light sources are arranged inside the lamp unit in such a manner as to sandwich the high beam light sources vertically.

2. The vehicle lamp of claim 1,
wherein a first light source group made up of the plurality of first light sources and a second light source group made up of the plurality of second light sources are arranged inside the lamp unit,
the first light source group has a reflector for each of the first light sources,
each of the reflectors is provided on a base plate, and
the vehicle lamp further has a light guide member arranged inside the lamp unit and adapted to cover the first light source group and the second light source group from the side of the lens.

3. The vehicle lamp of claim 2,
wherein a light shielding body supported by the light guide member is further provided in the lamp unit to adjust an irradiation area of the second light sources.

4. A vehicle lamp comprising:
a plurality of light sources;
a housing;
a lens supported by the housing; and
a holder arranged inside a lamp unit that is formed with the housing and the lens to adjust optical axes of the light sources by tilting,
wherein the plurality of light sources include first light sources supported by the holder and second light sources that produce a smaller amount of light than the first light sources, and the second light sources are supported independently by a component other than the holder of the vehicle lamp, the component not permitting adjustment of an optical axis, wherein a first light source group made up of the first light sources and a second light source group made up of the second light sources are arranged inside the lamp unit, the first light source group has a reflector for each of the first light sources, each of the reflectors is provided on a base plate, and the vehicle lamp further has a light guide member arranged inside the lamp unit and adapted to cover the first light source group and the second light source group from the side of the lens.

5. The vehicle lamp of claim 4, wherein the first light sources and the second light sources are low beam light sources, and high beam light sources are supported by the holder.

6. The vehicle lamp of claim 5, wherein the first light sources and the second light sources are arranged inside the lamp unit in such a manner as to sandwich the high beam light sources vertically.

7. The vehicle lamp of claim 4, wherein a light shielding body supported by the light guide member is further provided in the lamp unit to adjust an irradiation area of the second light sources.

8. The vehicle lamp of claim 7, wherein the first light sources and the second light sources are low beam light sources, and high beam light sources are supported by the holder.

9. The vehicle lamp of claim 8, wherein the first light sources and the second light sources are arranged inside the lamp unit in such a manner as to sandwich the high beam light sources vertically.

\* \* \* \* \*